United States Patent [19]

Wen-Ming

[11] Patent Number: 5,681,157
[45] Date of Patent: Oct. 28, 1997

[54] ROTARY COMBUSTION UNIT FOR ROTARY INTERNAL COMBUSTION ENGINE

[76] Inventor: Liu Wen-Ming, 2F, No. 21, Hsin Wang Lane, Chung Cheng Rd., Hsin Chuang City, Taipei Hsien, Taiwan

[21] Appl. No.: 248,168

[22] Filed: May 24, 1994

[51] Int. Cl.$^6$ ................................................ F02B 53/08
[52] U.S. Cl. ..................... 418/111; 418/139; 418/248; 123/223
[58] Field of Search ....................... 418/111, 139, 418/248; 123/223

[56] References Cited

U.S. PATENT DOCUMENTS

| | | | |
|---|---|---|---|
| 349,888 | 9/1886 | Knebel | 418/248 |
| 694,333 | 2/1902 | Szabo | 418/111 |
| 809,180 | 1/1906 | Fredlund | 418/248 |
| 832,848 | 10/1906 | Croston | 418/139 |
| 1,242,692 | 10/1917 | Hibner | 418/248 |
| 1,300,666 | 4/1919 | Spencer | 418/248 |

*Primary Examiner*—Michael Koczo
*Attorney, Agent, or Firm*—Morton J. Rosenberg; David I. Klein

[57] ABSTRACT

Disclosed is a rotary combustion unit for a rotary internal combustion engine usually cooperated with a cooperative compressor unit having a two-blade cam piston with a main shaft rotated in a cylinder, two spring-loaded reciprocating gate members reciprocated by the cam piston formed a power stroke and a reset stroke being alternatively repeated while the spark plugs ignite the compressed mixed gas delivered by the cooperative compressor unit repeatedly for a certain instant; and a series of sealing devices disposed to all moving contact surfaces to seal the leakages in all condition even if the contact surfaces were worn out due to a long period of engine running.

7 Claims, 12 Drawing Sheets

ROTARY COMBUSTION UNIT FOR ROTARY INTERNAL COMBUSTION ENGINE

BACKGROUND FOR THE INVENTION

A rotary combustion unit for a rotary internal combustion engine usually operated with a cooperative compression unit comprises:

a cylinder composed of two opposite cylinder wall plates, two filler blocks and two cylinder covers; and a rotary cam piston composed of a two-blade cam piston body rotated in the cylinder, a main shaft for delivering the power output, and two end disks;

two reciprocating gate members supported by springs reciprocatablly drived by the cam piston and separating the cylinder into combustion and exhausting chambers respectively.

A series of sealing devices are disposed to all moving contact parts including two pivotable sealing strips mounted at a front edge of either reciprocating gate member in contact with the surface of the cam piston body, four end edge sealing blocks engaged on both top and bottom edges of two reciprocating gate members respectively in contact with two end disks of the rotary piston and two sealing pieces each installed in a tip edge of either blade of the cam piston body respectively in contact with the inner wall of the cylinder.

A variety of rotary engines have been proposed, and some of them have appeared on the market for a short period. FIG. 1 illustrates a well known triangular piston type of rotary engine according to the prior art, which is generally comprised of a cylinder A and a triangular piston B. The cylinder A has an intake port A1 and an exhaust port A2 at the top and an ignition plug A3 at the bottom. The triangular piston B is mounted on an eccentric shaft F and rotated by it within the cylinder A, having three tip edges angles B1, B2, B3 of piston B moved against the inside wall of the cylinder A in dividing it into three separate air chambers C, D, E. In FIG. 1A, chamber C is being compressed; chamber D is being expanded; chamber E starts to expel gas. In FIG. 1B, chamber E is at the end of the exhaust stroke; chamber C is at the end of the compression stroke and the beginning of the ignition process; chamber D is at the end of expansion and going to be released. In FIG. 1C, chamber C is ignited; chamber E stops exhaustion and starts drawing in fuel mixture. In FIG. 1D, chamber C starts to expand; chamber D starts to expel gas; chamber E starts to compress. The rotary engine repeats the strokes from FIG. 1A to FIG. 1D. The chambers C, D, E complete a circulation each time the triangular piston B was rotated through one turn. This structure requires high precision so that the triangular piston B can be smoothly positioned and rotated inside the cylinder A to divide the internal space of the cylinder A into three separte air chambers C, D, E. Because the three tip edges B1, B2, B3 of the triangular piston B are disposed in contact with the inside wall of the cylinder A only by a lnear contact as the engine is operating, a leakage may occur between either two adjacent chambers. In order to eliminate this problem, a sealing strip may be designed for respectively inserting in a groove on each tip edge of the triangular piston B and expected to obtain an area contact against the inside wall of the cylinder A. But, there is not a design can work perfectly due to two basic disadvantages of a triangular piston type rotary engine as follows:

1. The curvature of the inside wall of the cylinder is not uniform. That means the contact surface of a sealing strip should be designed of a changable curvature for matching the variable curvature of the cylinder wall. It can't be done.

2. A sealing strip is very hard to maintain a normal contact against the cylinder wall while the contact angle changes in a large range almost up to 180°.

Therefore, the problem of leakage sealing results in a bottle neck of the development of rotary combustion engine.

SUMMARY OF THE INVENTION

The present invention solves the bottle neck to eliminate the disadvantages. According to a preferred embodiment, the rotary combustion unit comprises:

a rotary piston composed of a two-blade cam piston body each cam-blade having a long semicircular upper portion and a short slope plane lower portion and a spring supported sealing piece disposed in a slot at a tip edge of the cam-blade, a main shaft disposed to either end on a center of the cam piston body for power output, and two end disks respectively mounted on either end of the cam piston body;

a cylinder composed of two opposite wall plates, each formed of a semicircular central portion and two flat side portions disposed to two sides symmetrically extended from the central portion, two filler blocks filled in either gap between two opposite flat side portions of two wall plates respectively, and two cylinder covers respectively covered on the top end and bottom end of the cylinder as the unit is fully assembled;

two reciprocating gate members each composed of a gate block loaded on reset springs, a pivotable sealing strip mounted at a leading edge toward the cam piston body, and two spring supported end edge sealing blocks disposed to the top edge and the bottom edge of the gate block respectively. And characterized that each pivotable sealing strip of either spring loaded reciprocating gate member has a concave curved surface of such a curvature equal to the convex curvature of the semicircular upper portion of the cam piston body as well as each spring supported sealing piece of either blade of the cam piston body has a convex curved surface of such a curvature equal to the concave curvature of the inner wall of the cylinder so as to maintain an area contact not a linera contact respectively for providing a perfect sealing effect during the engine running.

DETAILED DESCRIPTION OF THE PREFERRED EMBODIMENT

Figure 1A:
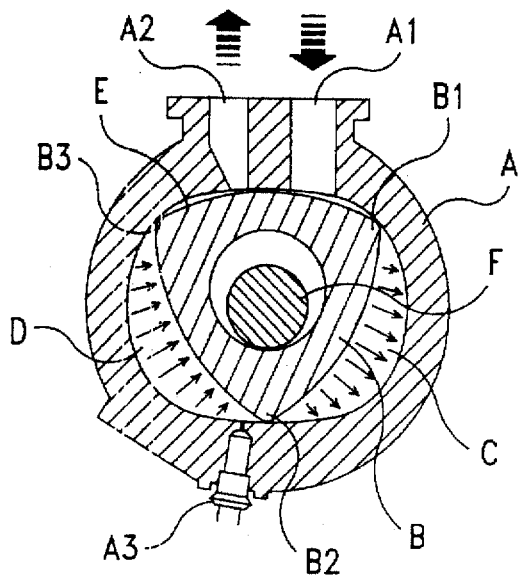
FIG. 1A, 1B, 1C and 1D are cross sectional views of a triangular piston type rotary engine according to the prior art showing different positions of the triangular piston.
Figure 1B:
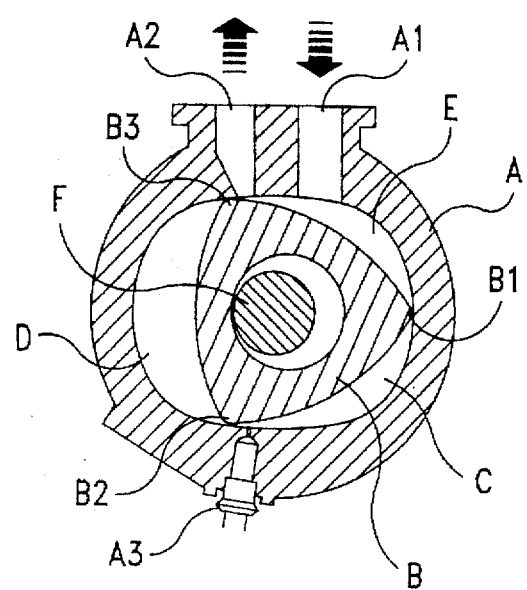
Figure 1C:
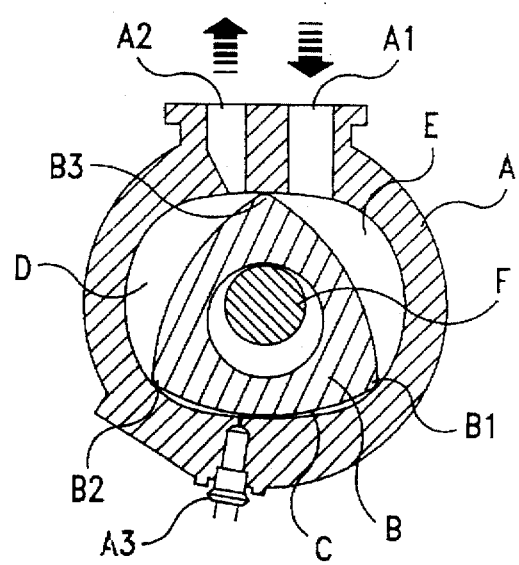
Figure 1D:
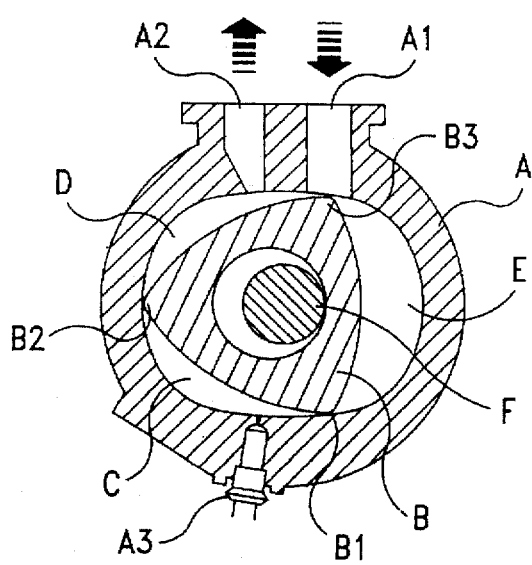
Figure 2:
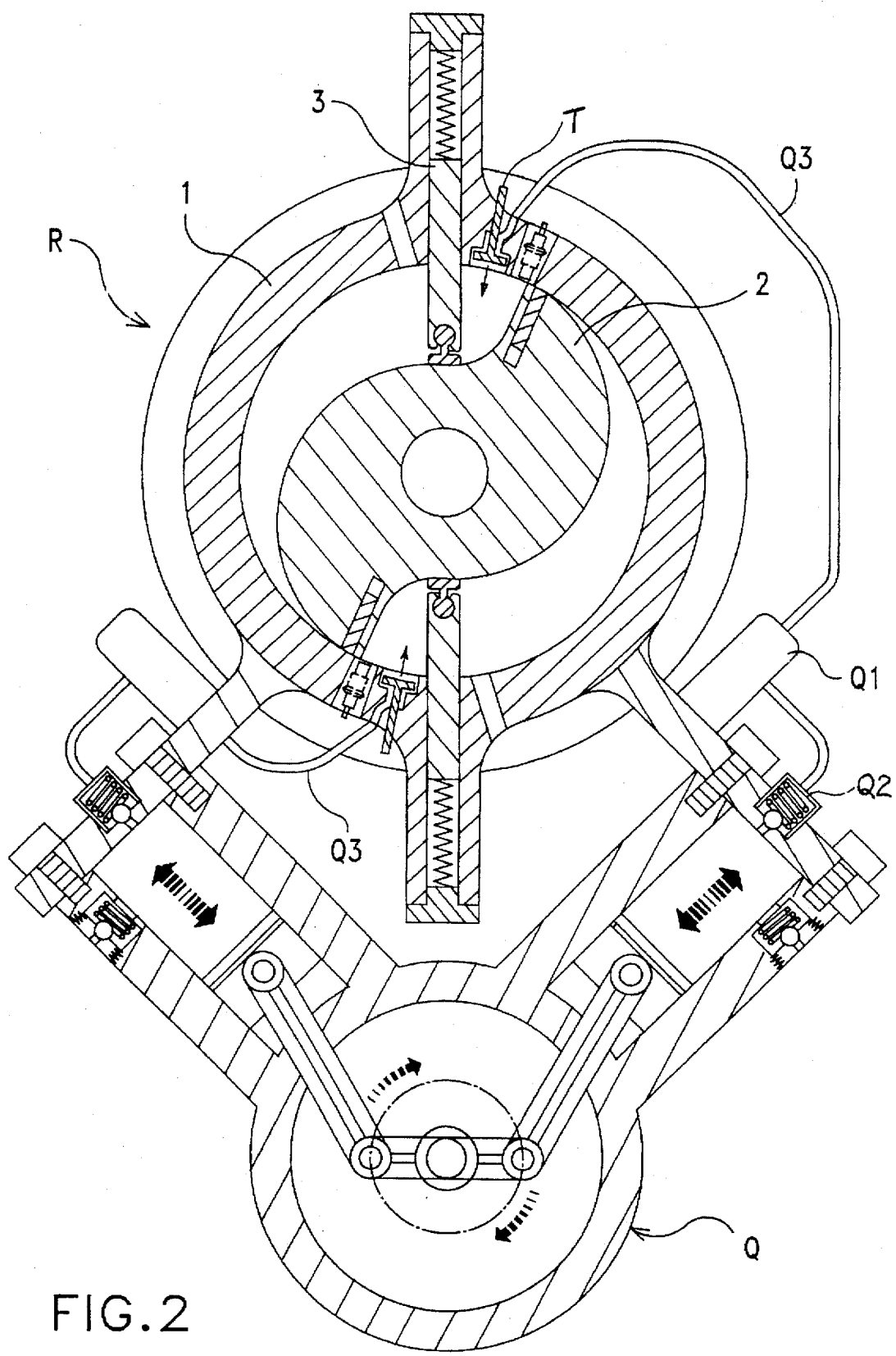
FIG. 2 is a plan view of a rotary combustion unit for a rotary internal combustion engine according to the present invention cooperated with a conventional compressor.

Referring to FIG. 2, a rotary combustion unit R in accordance with the present invention comprises a cylinder 1, a rotary cam piston 2 and two reciprocating gate members 3 operated with a cooperative compressor unit Q. The mixed gas is guided into a compressor unit Q via an one-way valve Q2 from a carburetor (not shown) and being compressed to a high density therein then guided into an accumulator Q1 through a pipe Q3 ready for delivering to the rotary combustion unit R through a valve T for an instant.

It is clear that the rotary combustion unit R undertakes the intake, combustion and exhaust strokes and leaving the compression stroke to be undertaken by a cooperative compressor unit Q.

Figure 3A:
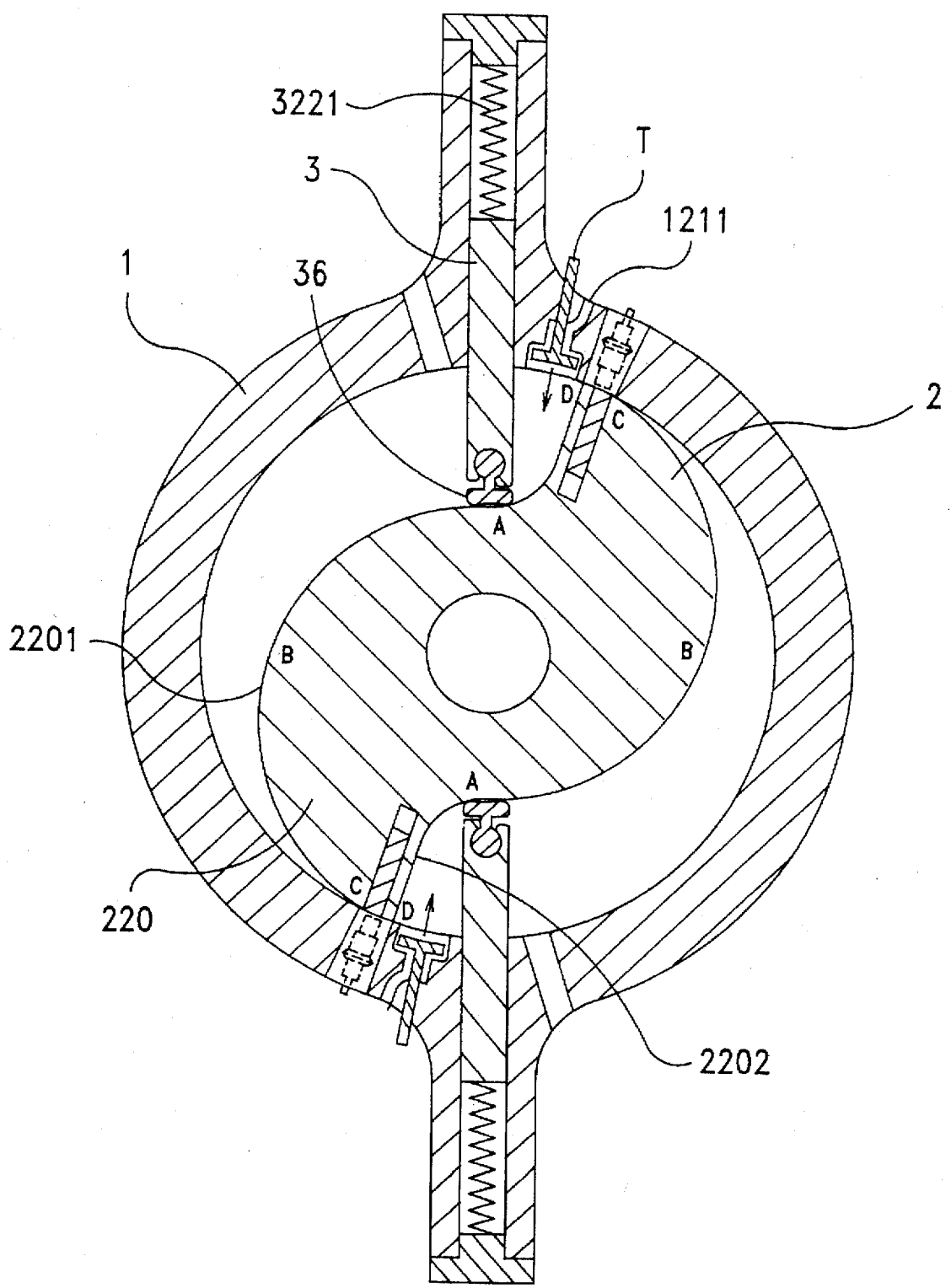
FIG. 3A, 3B, 3C and 3D are cross sectional views of the rotary combustion unit showing different positions of the rotary cam piston during a complete cycle of combustion.
Figure 3B:
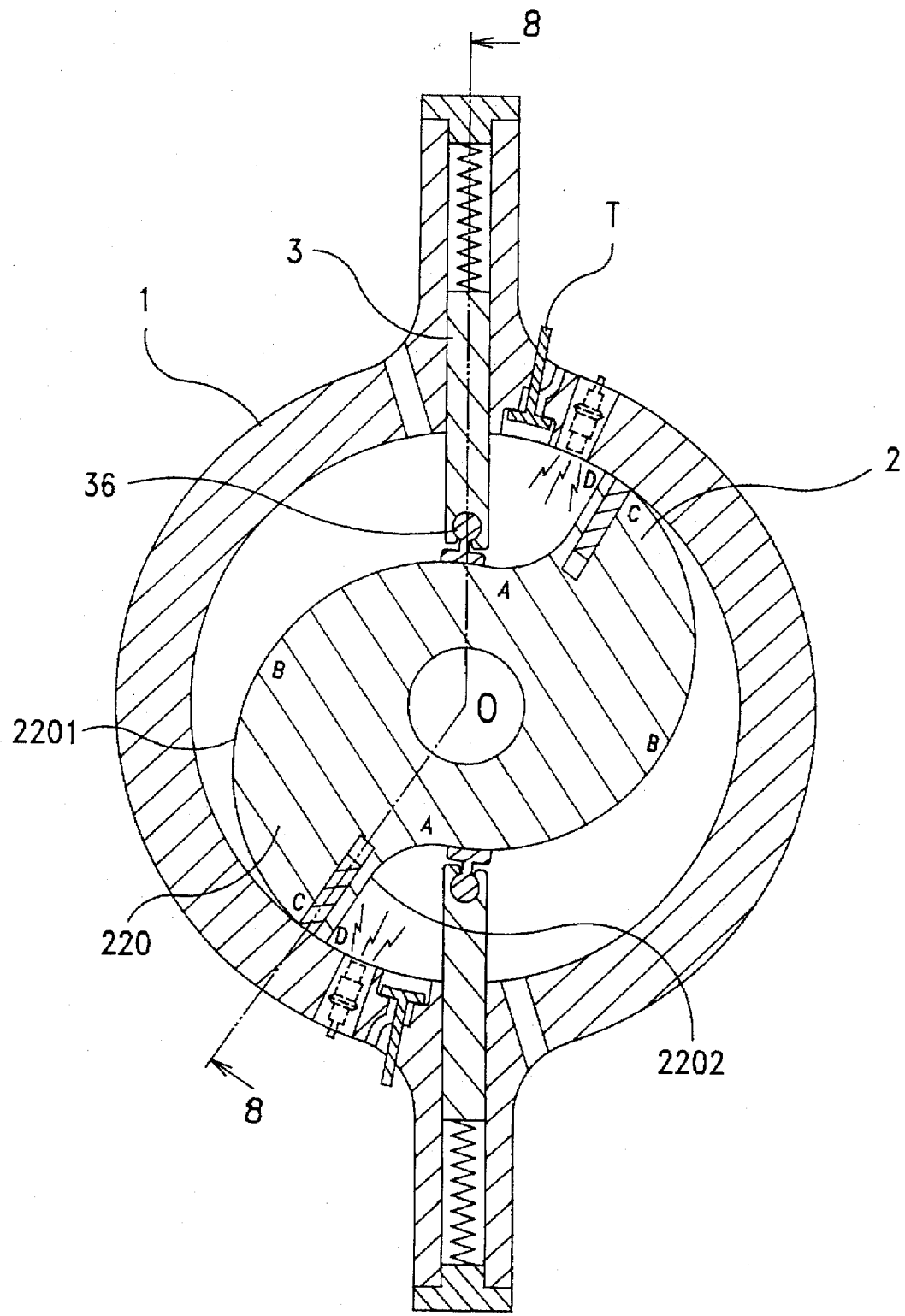
Figure 3C:
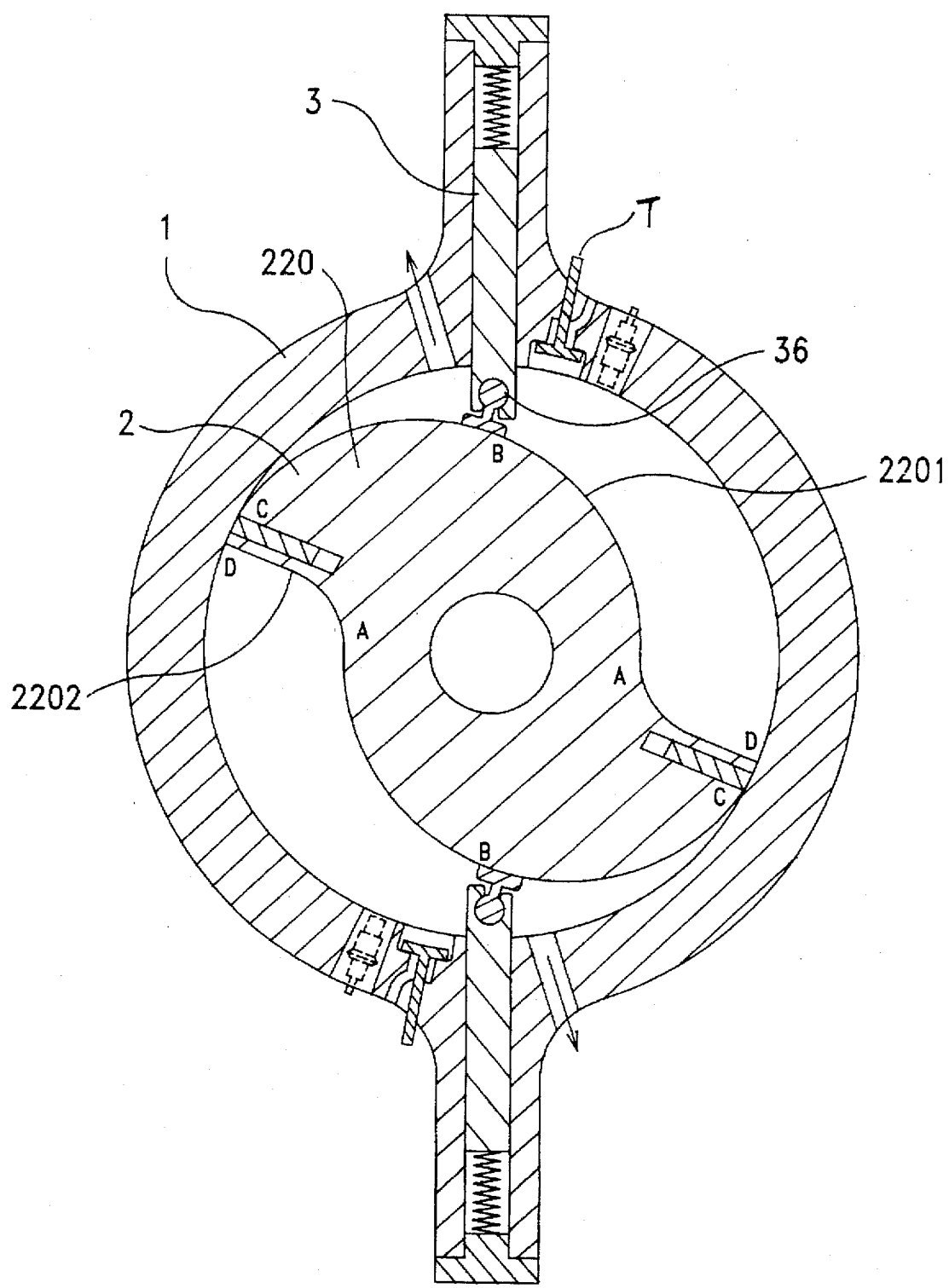
Figure 3D:
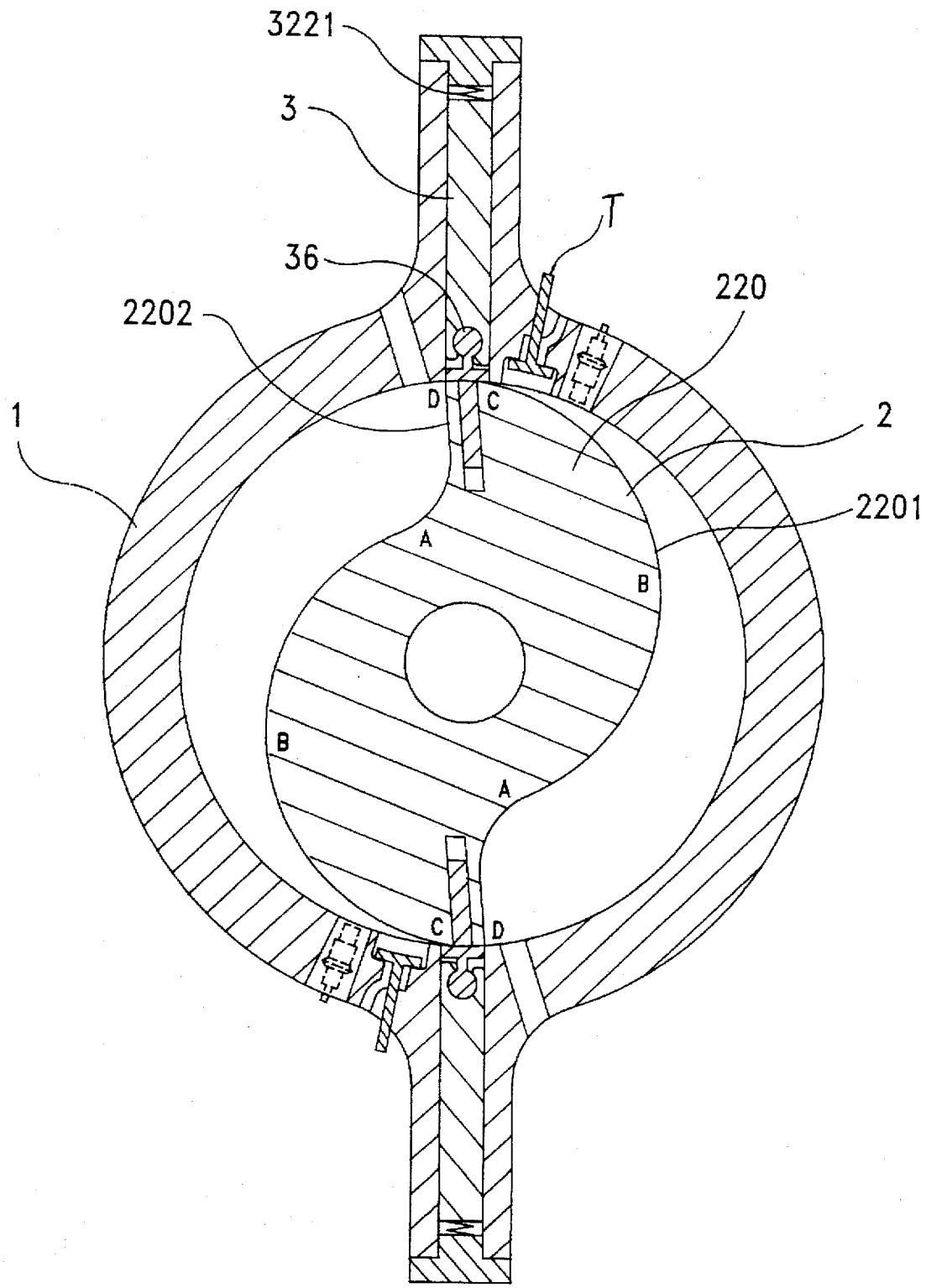

Referring to FIGS. 3A, 3B, 3C and 3D, a rotary cam piston 2 rotates clockwise at different points in cylinder 1 and to partition the cylinder space into two symmetry sections, while each section is divided into two adjacent chambers by a reciprocating gate member 3 as a combustion chamber at one side and an exhaust chamber at other side. The combustion stroke and the exhaust stroke (for last combustion) are occured in adjacent chambers at same time so as to make a complete combustion cycle within one half turn rotation of the rotary cam piston 2 during the engine is running while:

FIG. 3A shows the beginning of an intake stroke, the pivotable sealing strip 36 of the reciprocating gate member 3 contacted to the cam surface at point A as an initial of the semicircular surface ABC of the upper portion 2201 of the cam-blade 220, and began to get an area contact of a matched curvature thereof, the intake valve T opened instantaneously for allowing the high density mixed gas rapidly rushed into the combustion chamber and FIG. 3B shows the end of an intake stroke, the spark plug ignition as soon as the intake valve T has been closed, and starting to a combustion stroke, and FIG. 3C shows the position of the pivotable sealing strip 36 in contact with the semicirculars surface 2201 of the cam piston 2 at a point B having an almost maxim pivot angle thereof and FIG. 3D shows the end of a combustion stroke, the cam blades 220 forced the reciprocating gate members 3 fully into the gaps and the two sections of cylinder space being both side exhausted.

A reset stroke from FIG. 3D to FIG. 3A, there is no pressure difference between two adjacent chambers with both sides exhausted, and it is not necessary to consider the sealing effect thereof, the pivotable sealing strip 36 of the reciprocating gate member 3 just sliding down from point D to point A freely around the slope plane of the lower portion 2202 of the cam-blade 220 of the cam piston 2 as the reciprocating gate member 3 is pushed out by the reset springs 3221, while a power stroke from FIG. 3A through FIGS. 3B, 3C to 3D showing the concave surface of the pivotable sealing strip 36 of the reciprocating gate member 3 in contact with the semicircular surface ABC of the upper portion 2201 of the cam piston body 22 consistently matched with a coincident curvature to provide a perfect area contact for sealing.

Figure 4:
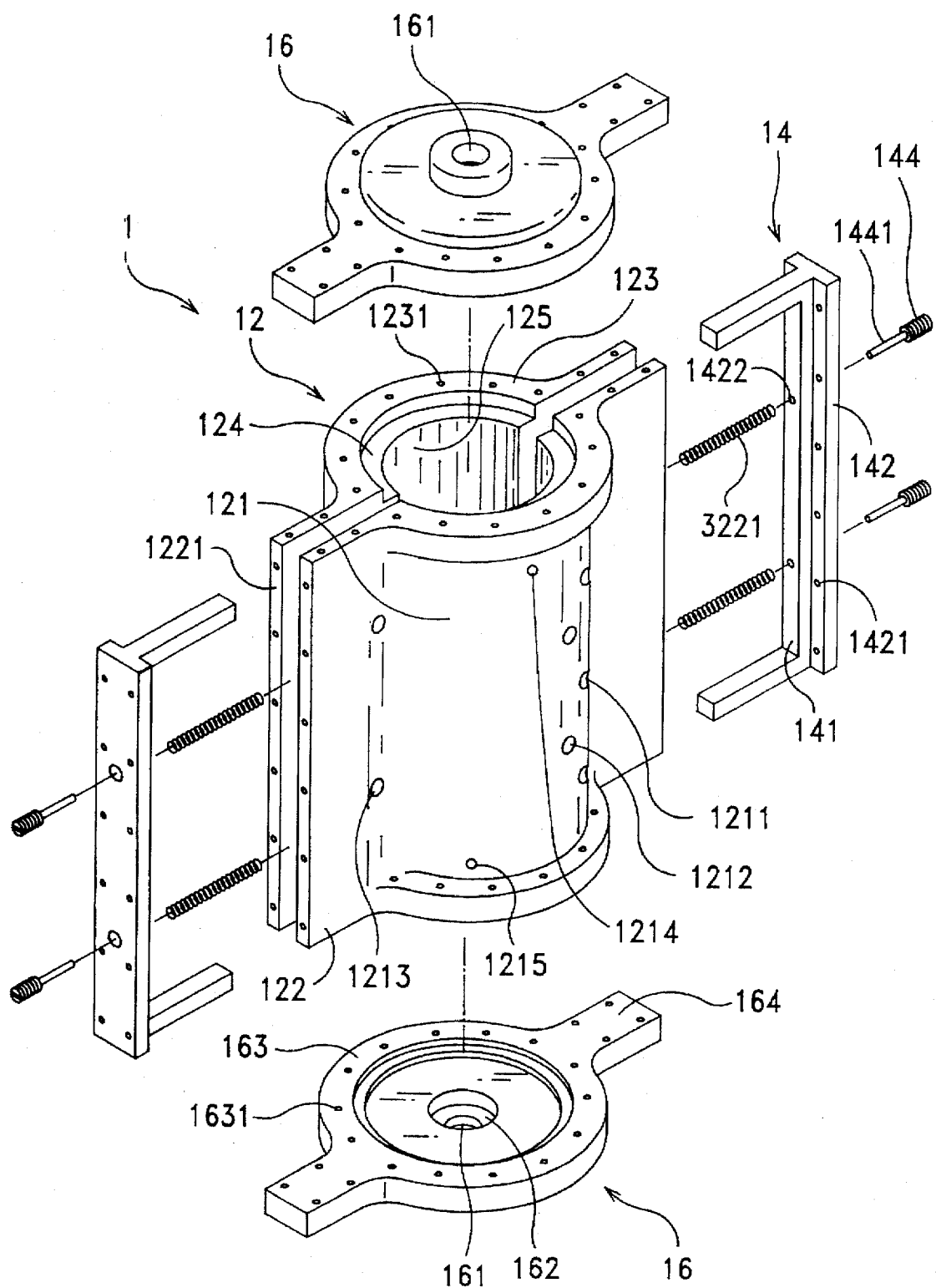
FIG. 4 is an exploded view of the cylinder of the rotary combustion unit.

Referring to FIG. 4, a cylinder 1 comprises:

two opposite cylinder wall plates 12 each formed of a semicircular central portion 121 with flanges 123 expanded outwardly on both top and bottom edges therefrom and a hollow space 124 inside each flange 123 over either end edge of an inner wall 125, two flat side portions 122 extended symmetrically to opposite sides. On the semicircular central portion 121 there are at least two intake holes 1211 nearest to the root of one flat side portion 122 and at least two exhaust holes 1213 nearest to the root of another flat side portion 122 of either cylinder wall plate 12, and holes 1212 for spark plugs, water inlet and outlet 1214, 1215 for water jacket cooling system (not shown) thereon; a plurality of screw holes 1231 and 1221 disposed on either flange 123 and a side edge of either flat side portion 122, two filler blocks 14 each composed of a "⊏" shaped frame 141 with a certain thickness filled between two flat side portions 122 of two opposite cylinder wall plates 12 from either side edge thereinto so as to build up a true circular cylinder between two semicircular central portions 121 and two oppoite opening gaps between two flat side portions 122, and a "T" sectional back plate 142 having at least two thread holes 1422 and a plurality of screw holes 1421 therein, and at least two thread plugs 144 each having a center pin 1441 for loading a reset spring 3221 in place mounted through the thread hole 1422 thereinto, two cylinder covers 16, each having a center hole 161, and a bearing housing 162 inside the center hole 161, a flange 163, two side extension portion 164, and a plurality of screw holes 1631, and a gasket (not shown) may served for assembling.

Figure 5:
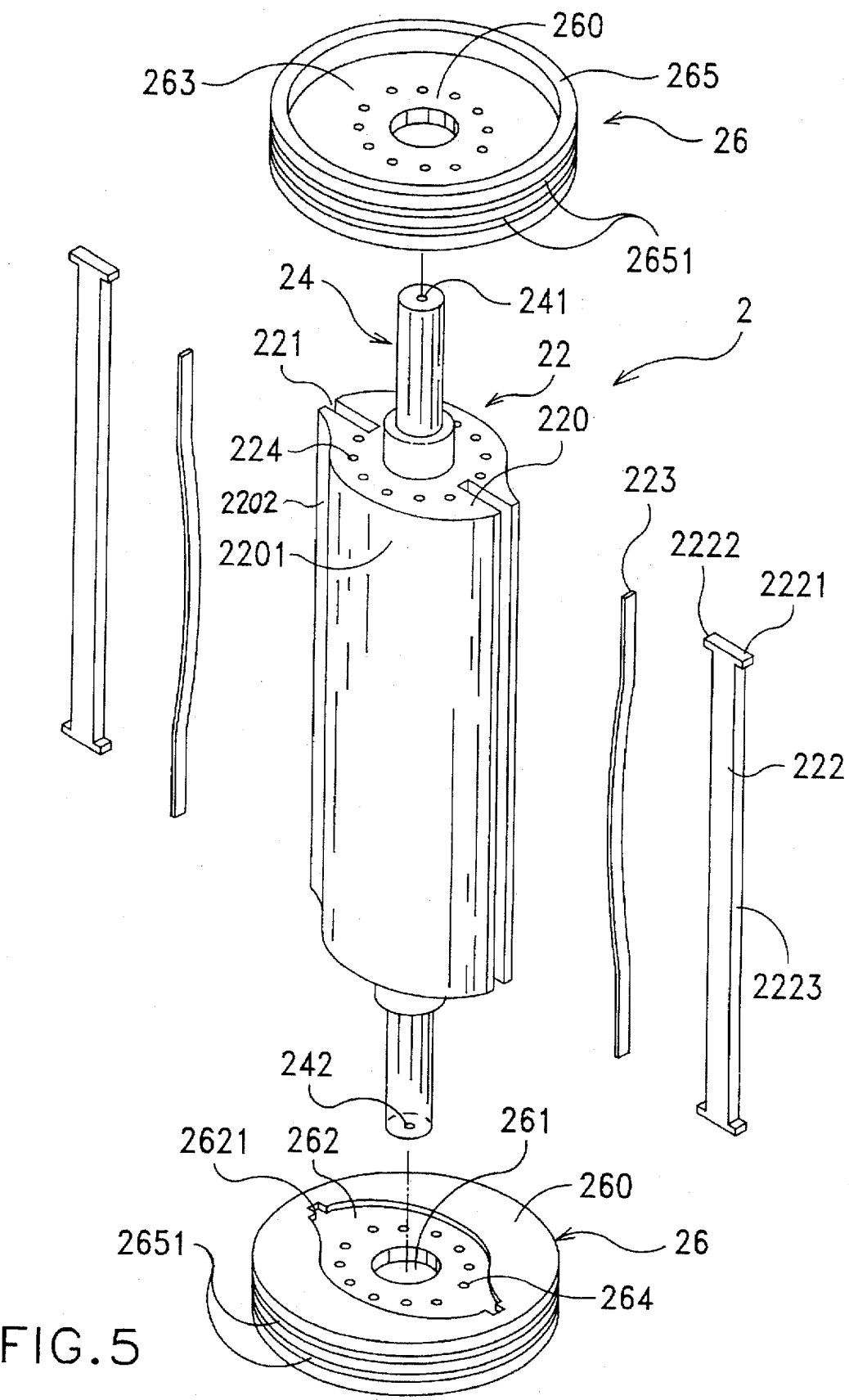
FIG. 5 is an exploded view of the rotary piston of the rotary combustion unit.

Referring to FIG. 5, a rotary piston 2 comprises:

a rotary cam piston body 22 having two cam blades 220 symmetrically opposited to a center each blade composed of a long semicircular curve upper portion 2201 and a short slope plane lower portion 2202, an opening slot 221 at a tip edge of either cam-blade 220 respectively and, an "T" shaped sealing piece 222 having two outward juts 2221 and two inward juts 2222 respectively one each at either end edge thereof, and an outward convex curved surface 2223 of a curvature coincided with the concave curvature of the inner wall 125 of the cylinder wall plate 12 supported by spring plate 223 and inserted into the opening slot 221; and a plurality of screw holes 224 on both top and bottom end surfaces of the cam piston body 22, a main shaft 24 extended outwardly from either end surface of the cam piston body 22 at a center for power output, has a water inlet 241 and outlet 242 at respective end of the main shaft 24 for cooling a coolant jacket (not shown) inside the cam piston body 22, two end disks 26 each having a center hole 261 through a disk plate 260, a mortise 262 caved in an inner face of the disk plate 260 for tenoning either end of the cam piston body 22 therein, two elongated slots 2621 disposed respectively to either tip edge of the mortise 262 for receiving the outward juts 2221 of the "T" shapted sealing pieces 222 respectively therein, a hollow space 263 surrounded by an upward disk wall 265 over the disk plate 260 for building up an oil chamber therein, at least two ring grooves 2651 disposed around the outerface of the disk wall 265 for mounting piston rings (not shown) therein, a plurality of screw holes 264 through the disk plate 260 for fastening the end disk 26 onto either end of cam piston body 22.

Figure 6:
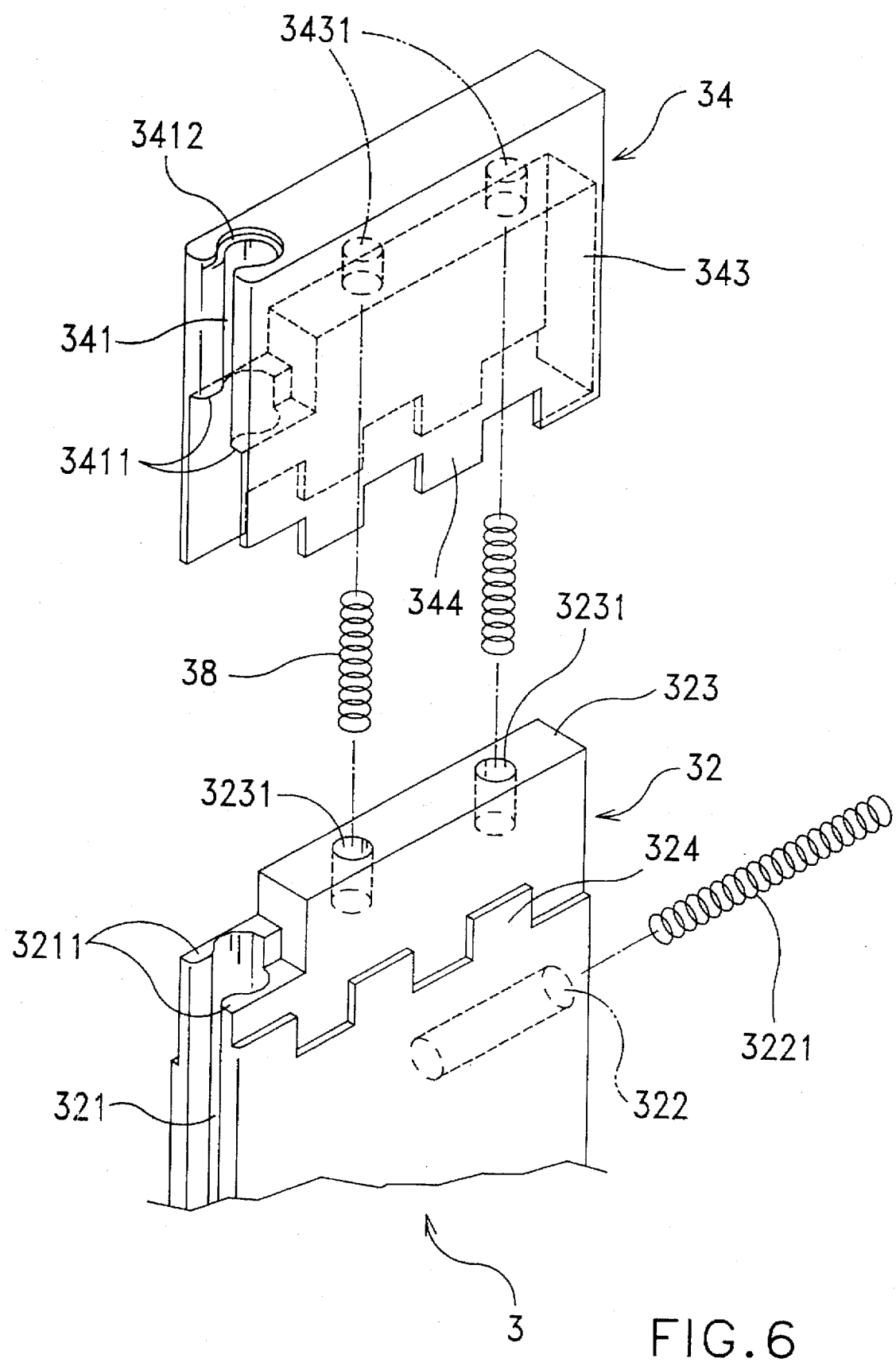
FIG. 6, 6A and 6B are exploded views of the reciprocating gate member with sealing devices of the rotary combustion unit.
Figures 6A, 6B:
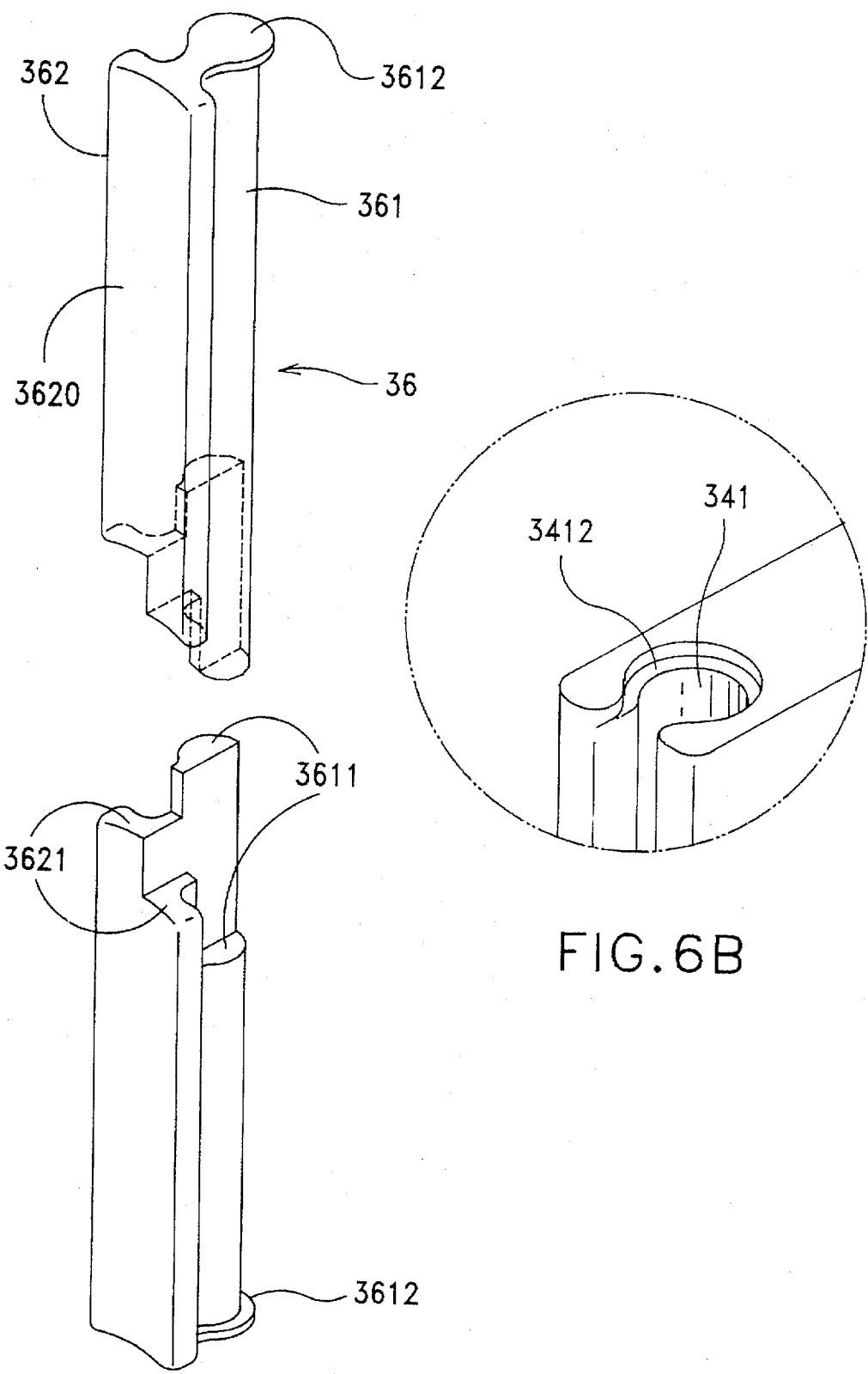

Referring to FIGS. 6, 6A and 6B, two reciprocating gate members 3 each comprises:

a gate block 32 having an omega (Ω) shaped opening 321 at a front edge toward the cam piston body 22 longitudinally through a top to a bottom, at least two spring retaining holes 322 drilled laterally from the rear edge for loading reset springs 3221 one each therein, two rectangular tenons 323 respectively protruded beyond both top and bottom end symmetrically between two square-toothed walls 324 thereon (bottom end not shown), at least two spring retaining holes 3231 in an end edge of the tenon 323 for loading compression springs 38 respectively one each therein, a stepwise halfway cutting overlap joint 3211 at a front edge of the tenon 323 to cut the omega ($\Omega$) shaped opening 321 in different elevations on two opposite side for an overlap sealing, two end edge sealing blocks 34 disposed symmetrically to both top and bottom edges of the gate block 32 respectively (bottom edge not shown) supported by springs 38 for sealing the leakage between the reciprocating gate member 3 and the end disk 26, each have an omega ($\Omega$) shaped opening 341 at a front edge with an enlarged circular space 3412 at a tip edge of the round hole portion therein (referring to FIG. 6B), a rectangular mortise 343 between two square-toothed walls 344 with two spring retaining holes 3431 therein, a stepwise halfway cutting overlap joint 3411 hidden inside between the square-toothed walls 344 at a from edge therein, and engaged with the gate block 32 by a male and female matching method not only the tenon 323 matched with the mortise 343 but also the square-toothed walls 324 matched with the opposite square-toothed wall 344 and the stepwise halfway cutting overlap joints 3211 matched with 3411 so as to eliminate any leakage occuring between two adjacent chambers separated by the gate block 32 even as the end edge sealing block 34 is raised up by the elastic force of the spring 38 due to the worn out of the end disk 26 or the end edge sealing block 34, a pivotable sealing strip 36 (referring to FIG. 6A) composed of a round bar portion 361 with an enlarged circular head 3612 at either tip edge, a "T" sectional portion strip 362 extended to one side of the round portion 361 having a curved surface 3620 of a concave curvature coincided with the convex curvature of the semicircular upper portion 2201 of the cam-blade 220 of the cam piston body 22, and being cut into two pieces at a middle engaged by the stepwise halfway cutting overlap joints 3611, 3621 respectively at the round portion 361 and the "T" portion 362. So as able to lift separatly accompanied with the end sealing block 34 for providing a complete plane top surface on the end edge sealing block 34 in contact with the end disk 24 of the rotary piston 2 for sealing the leakage during a worn out circumstane, because of the enlarged circular head 3612 of the sealing strip 36 being received in the enlarged circular space 3412 of the omega ($\Omega$) shaped opening 321 of the gate block 32 and engaged the stepwise halfway cutting overlap joints 3611 and 3621 together; an adequate clearance disposed to the gateway of the omega ($\Omega$) shaped opening 321 for allowing the pivotable sealing strip 36 being able to pivot a certain angle required for matching to the semicircular surface of the upper portion 2201 of the cam-blade 220 of the cam piston body 22 at different positions shown in FIGS. 3A, 3B, 3C and 3D.

Figure 7:
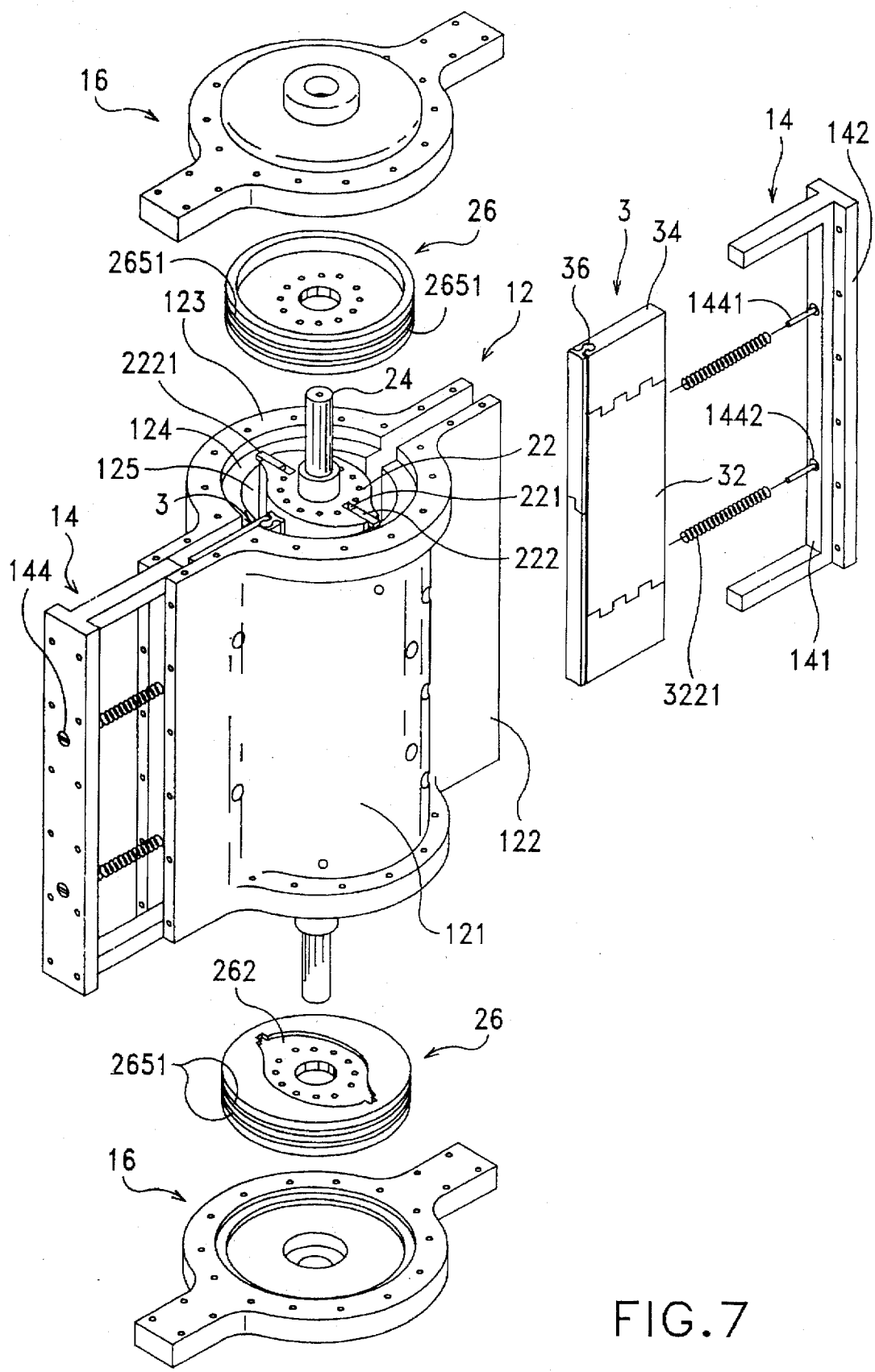
FIG. 7 is a exploded view showing the whole assembly of the combustion unit.

Referring to FIG. 7, a complete set of parts of the rotary combustion unit according to the preferred embodiment is arranged in position for assembly, and assembling as follows:

(1) As the reciprocating gate members 3 being subassembled and received into the "⊏" shaped frame 141 of either filler block 14 respectively with the reset springs 3221 unloaded, filling the filler blocks 14 into either gap between two flat side portions 122 of two opposite cylinder walls 12 respectively from either side edge and fastening down the back plate 142 onto the side edges of said side portion 122 by screws.

(2) Tenoning one end of the cam piston body 22 into the mortise 262 of one end disk 26 and fastened together by screws, then fastening the rings (not shown) into the ring grooves 265.

(3) Inserting the cam piston body 22 into the cylinder 1 from the bottom opening between the semicircular portions 121 of cyling wall plates 12 till the end disk 26 being fully received into the hollow space 124 inside the flange 123.

(4) Placing the "T" shaped sealing pieces 222 into either slot 221 of the cam piston body 22 respectively (referring to FIG. 5) and forcing the spring plates 223 into either slot 221 behind either "T" shaped sealing piece 222 and to make sure that the outer juts 2221 of either "T" shaped sealing piece 222 are striding over the top and bottom edges of the inner wall 125 of the cylinder 1 and the curved outer surface 2223 (referring to FIG. 5) of either "T" shaped sealing piece 222 is in contact with the surface of the inner wall 125 of the cylinder 1 perfectly and respectively supported on the spring plate 223 (not shown).

(5) Loading the reset springs 3221 into the spring retaining holes 322 of the gate blocks 32 through the thread holes 1422 on the back plates 142 of the filler blocks 114 then mounting the thread plugs 144 into either thread hole 1422 respectively for holding the reset spring 3221 in place by the center pin 1441 of the thread plug 144 and to make sure that the reciprocating gate members 3 are reciprocatably drived by the cam piston body 22 and the reset springs 3221.

(6) Mounting the left end disk 26 with the rings (not shown) fastened in place into the hollow space 124 inside the upper flange 123 over the top edge of the inner wall 125 of cylinder and to make sure that the top end of the cam piston body 22 is tenoned in to the mortise 262, then fastening down by screws.

(7) Mounting the cylinder covers 16 onto both ends of the flanges and fastening down by screws with gasket in between (not shown).

Figure 8:
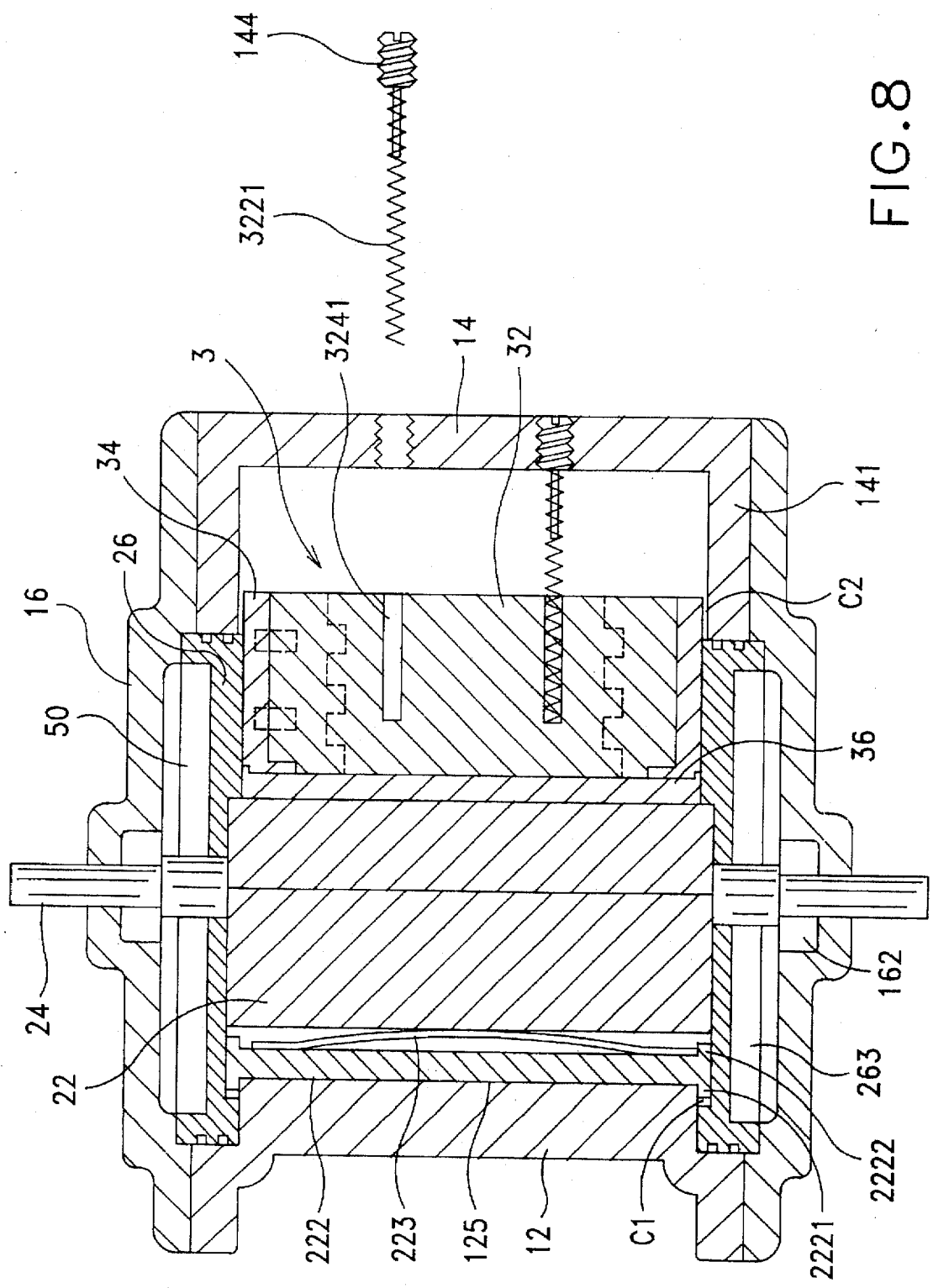
FIG. 8 is a sectional view of a fully assembled rotary combustion unit according to a broken cutting line 8—8 of FIG. 3B which the right side cut by line 8—8 showing a section of a pivotable sealing strip of the reciprocating gate member extended in contact with the surface of the cam piston body while the left side cut by line 8—8 showing a section of a sealing piece of the cam-blade in contact with the inner surface of the cylinder wall.

FIG. 8 shows a sectional view being cut by a broken line 8—8 according to FIG. 3B, while a right side sectional view shows the pivotable sealing strip 36 of the reciprocating gate member 3 being in contact with the surface of the cam piston body 22 with the gate member 3 supported by the reset springs 3221, and the end edge sealing blocks 34 being in contact with the surface of either end disk 26 respectively and loaded by the springs 38, a clearence C2 disposed between the surface of a end edge sealing block 34 and an inner face of a lintel of the "⊏" shaped frame 141 of the filler bolck 14 for allowing the end edge sealing block 34 being able to extend as the surface of the ceiling disk 26 were wore out. And while the left side sectional view shows the "T" shaped sealing piece 222 of the cam piston body 22 being in contact with the surface of the inner wall 125 of cylinder 1 supported by the spring plate 223, the inner juts 2222 of the "T" shaped sealing piece 222 disposed for keeping the spring plate 223 in place and the outer juts 2221 of the "T" shaped sealing piece 222 being received in the extended slots 2621 of the mortises 262 of either end disk 26 respectively and strided over the top and bottom edges of the inner wall 125 of cylinder 1, a clearence C1 disposed between a tip edge of the outer jut 2221 and an end edge of the elongated slot 2621 for allowing the sealing piece 222 being able to extend as the surface of the inner wall 125 of cylinder 1 were worn out.

Two lubricant chambers 50 of a lubricating system (not shown) each formed by the hollow space 263 of either end disk 26 inside either cylinder cover 16 guide the lubricant onto the surfaces of all sealing devices through a series of eyelets and grooves (not shown) which can easily be completed by conventional skill.

I claim:

1. A rotary combustion unit for a rotary internal combustion engine comprises:

a rotary piston consisted of a two-cam-blade cam piston body, a main shaft disposed longitudinally to either end of said cam piston body at a center, two end disks each having a center hole for passing through said main shaft and a caved mortise of a shape same as the cross section of said cam piston body on an inner face thereof so as to tenon either end of said cam piston body therein and fastened down by screws;

a cylinder composed of two opposite cylinder wall plates each having a semicircular central portion with semicircular flanges outwardly disposed over either end edge respectively with a hollow space disposed inside said flange for receiving either said end disk of said rotary piston therein, and two flat side portions symmetrically extended laterally to two opposite sides, two filler blocks each formed of a "⊏" shaped frame of a certain thickness filled in the space between said flat portions of said cylinder wall plates at either side so as to build up a true circular cylinder between said semicircular portions of said cylinder wall plates for receiving said cam piston body therein and simultaneously to build up two opposite gaps between said flat portions of said cylinder wall plates toward said cam pistion body, and a "T" back plate disposed to a back side of each said "⊏" shaped frame of said filler block, two cylinder covers each having a center hole for passing through said main shaft having a bearing housing inside said center hole and an outward flange with screw holes for mounting to either end of said cylinder;

two reciprocating gate members inserted into said opposite gaps between said flat portions of said cylinder wall plates respectively each having an omega (Ω) shaped longitudinal opening at a front edge toward said cam piston body for receiving a pivotable sealing strip in contact with the surface of said rotary cam piston body, at least two spring retaining holes disposed laterally on a rear edge for loading a reset spring respectively therein, two spring supported end edge sealing blocks disposed to both top and bottom edges in contact with the inner surface of either said end disk of said rotary piston.

2. A rotary combustion unit for a rotary internal combustion engine according to claim 1 wherein said pivotable sealing strip of said reciprocating gate member is formed of a round bar portion and a "T" head strip so as able to stick said round bar portion into said omega (Ω) shaped opening and leaving said "T" head strip protruded beyond said omega (Ω) shaped opening of said reciprocating gate member, and characterized that said pivotable sealing strip is composed of two pieces and engaged by a stepwise halfway cutting overlap joint at a middle, and having an enlarged circular head disposed to a tip edge of said round bar portion of either piece of said pivotable sealing strip, and further characterized said "T" head strip of said pivotable sealing strip having a concave curve surface with such a curvature coincided to a convex curvature of the semicircular surface of said upper portion of said cam-blade of said cam piston body to maintain a perfect area contact by a pivoting of said pivotable sealing strip during the power stroke as the engine runs.

3. A rotary combustion unit for a rotary internal combustion engine according to claim 1 wherein said spring supported end edge sealing blocks of said reciprocating gate members each having a rectangular mortise concealed between two square-toothed walls for receiving the tenon jutted to the end edge of said gate block of said reciprocating gate member and engaging said square-toothed walls to the contrary square-toothed walls of said gate block by a male-female engagement thereinto, and at least two compression spring respectively loaded in either said spring retaining hole in said mortise, characterized a stepwise halfway cutting overlap joint disposed to said omega (Ω) shaped opening at a front edge between said square-toothed walls therein for engaging with the contrary stepwise halfway cutting joint on said tenon of said gate block by an overlap engagement thereof.

4. A rotary combustion unit for a rotary internal combustion engine according to claim 1 wherein each said cam-blade of said two-cam-blade cam piston body comprises a longer semicircular surface upper portion of a uniform curvature, a shorter slope plane lower portion, and an opening slot disposed to a tip edge toward an inner wall of said cylinder longitudinally through a top end to a bottom end, an "T" shaped sealing piece installed in said opening slot having an outward jut and an inward jut respectively on both ends thereof, and a spring plate inserted therein characterized that the outer surface of said "T" shaped sealing piece in contact with said inner wall of said cylinder is formed of such a convex curvature coincided with a concave curvature of said inner wall of said cylinder.

5. A rotary combustion unit for a rotary internal combustion engine according to claim 3 wherein said omega (Ω) shaped opening of each said end edge sealing block having an enlarged circular space at a tip edge thereof for receiving said enlarged circular head of said round bar portion of said pivotable sealing strip so as to let said pivotable sealing strip being able to lift upwards accompanied with said end edge sealing block by springs to maintain said end edge sealing block a complete fall surface in contact with said end disk of said rotary piston consistantly in case of the contact surface of said end disk of said rotary piston were worn out, in which said stepwise halfway cutting overlap joint on a middle of said pivotable sealing strip still keeping no leakage thereat.

6. A rotary combustion unit for a rotary internal combustion engine according to claim 1 wherein a clearence disposed between a tip edge of said outward jut of said "T" shaped sealing piece and an end edge of said elongated slot of said mortise on said ceiling disk to allow said "T" shaped sealing piece being able extended in contact with said cylinder inner wall surface even if the contacting surface were worn out during a long period of using and characterized said clearence is concealed in said mortise and away from said chambers of said cylinder for eliminating any leakage between adjacent chambers therefore.

7. A rotary combustion unit for a rotary internal combustion engine according to claim 1 wherein a second clearence disposed between a tip edge surface of said end edge sealing block and an inner face of said "⊏" shaped frame to allow said end edge sealing block being able extended in contact with said end disk of said rotary piston even if the contacting surfaces were worn out during a long period of using and characterized said second clearence is concealed far away from said chambers of said cylinder for eliminating any leakage between adjacent chambers therefore.

* * * * *